United States Patent
Allard et al.

(10) Patent No.: US 8,181,770 B2
(45) Date of Patent: May 22, 2012

(54) DOWNLOADER CONVEYOR FOR APPLES AND LIKE OBJECTS

(75) Inventors: Randy Allard, Issaquah, WA (US); Vincent E. Bryan, Jr., Quincy, WA (US); Marc Bommarito, Mercer Island, WA (US); Alex E. Kunzler, Issaquah, WA (US); Pete Kunzler, Mercer Island, WA (US)

(73) Assignee: Picker Technologies LLC, Mercer Island, WA (US)

(*) Notice: Subject to any disclaimer, the term of this patent is extended or adjusted under 35 U.S.C. 154(b) by 0 days.

(21) Appl. No.: 12/703,084

(22) Filed: Feb. 9, 2010

(65) Prior Publication Data

US 2010/0230244 A1  Sep. 16, 2010

Related U.S. Application Data

(60) Provisional application No. 61/151,746, filed on Feb. 11, 2009.

(51) Int. Cl.
*B65G 29/00* (2006.01)

(52) U.S. Cl. ......... 198/706; 198/714; 198/529; 198/535

(58) Field of Classification Search .................. 198/529, 198/535, 703, 706, 713, 714
See application file for complete search history.

(56) References Cited

U.S. PATENT DOCUMENTS

| | | | | |
|---|---|---|---|---|
| 748,576 A * | 1/1904 | Bivert | ............ | 198/529 |
| 751,676 A * | 2/1904 | Nelson | ............ | 198/523 |
| 1,004,992 A * | 10/1911 | Christ | ............ | 198/529 |
| 1,776,856 A * | 9/1930 | Horton | ............ | 198/529 |
| 1,899,246 A * | 2/1933 | Schiff | ............ | 198/529 |
| 2,081,301 A * | 5/1937 | Hudspeth | ............ | 198/529 |
| 2,584,025 A * | 1/1952 | Kelsey | ............ | 198/705 |
| 3,648,870 A * | 3/1972 | Dutschke | ............ | 414/502 |
| 3,737,025 A * | 6/1973 | Miller et al. | ............ | 198/708 |
| 4,194,343 A | 3/1980 | Myers et al. | | |
| 4,501,350 A * | 2/1985 | Muller et al. | ............ | 198/477.1 |
| 7,080,730 B2 * | 7/2006 | Ours et al. | ............ | 198/861.1 |
| 7,968,839 B2 * | 6/2011 | Merenda et al. | ............ | 250/251 |
| 2003/0000968 A1 * | 1/2003 | Van Wijngaarden et al. | .. | 222/196 |

OTHER PUBLICATIONS

ISR PCTUS10023655, Aug. 11, 2010, Picker Technologies LLC.

\* cited by examiner

*Primary Examiner* — Mark A Deuble

(74) *Attorney, Agent, or Firm* — Hughes Socol Piers Resnick & Dym, Ltd.; Todd S. Parkhurst

(57) ABSTRACT

A downloader conveyor is described and claimed. The downloader conveyor comprises an endless belt to which a plurality of cups is pivotally attached. The cups are adapted to receive apples or like relatively delicate objects. As the cups containing the apples descend into the bin, the cups rotate so as to permit the apples or other objects to roll out of or exit from the cups and to retard the cup acceleration. Each apple engages a skirt, which breaks the fall of the exiting apple. A distal end of the skirt can be arranged to scrape over the bin floor or scrape over the top of apples or other objects already placed in the bin, so as to again break the fall of the apple so that the apple is placed in the bin without substantial freefall.

3 Claims, 4 Drawing Sheets

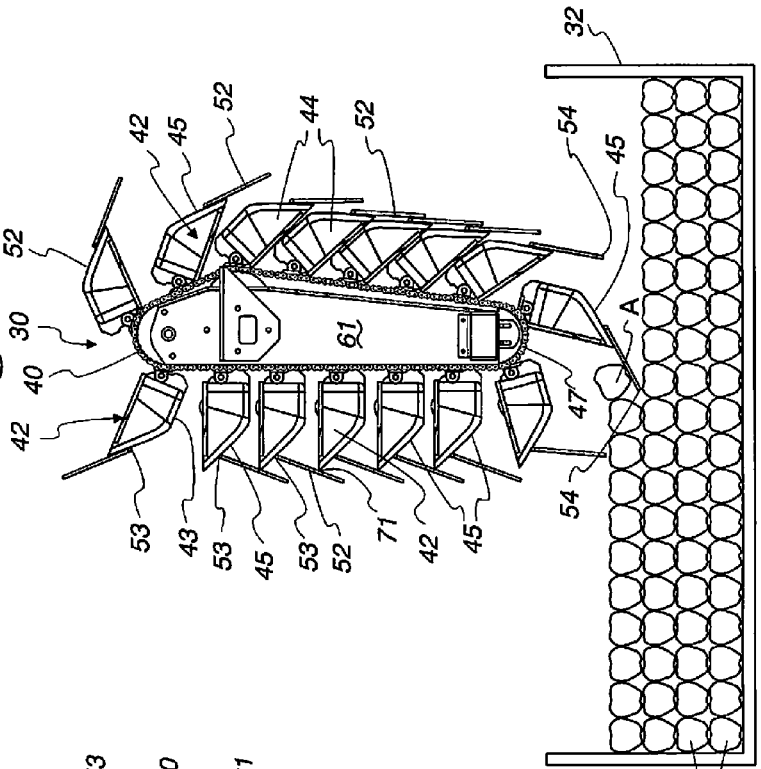
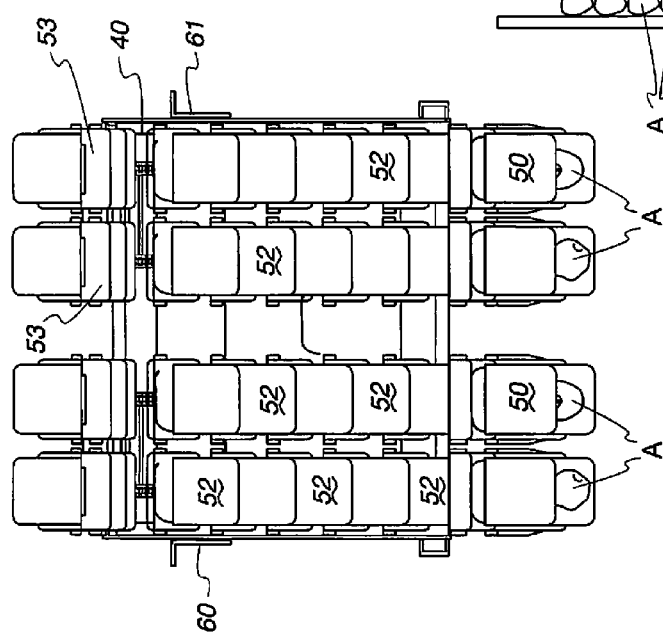

DOWNLOADER CONVEYOR FOR APPLES AND LIKE OBJECTS

This application claims priority from U.S. provisional Ser. No. 61/151,746 filed Feb. 11, 2009 entitled "Downloader Conveyor for Apples and Like Objects."

BACKGROUND OF THE INVENTION

The invention relates generally to conveyors, and more particularly concerns a conveyor especially adapted to quickly handle discrete objects which are easily bruised or damaged.

Apples and like fruit must be handled gently when they are picked from apple trees and placed in collecting bins; and when they are handled in packing houses, and in subsequent transport and sales operations. Bruised and damaged fruit can have substantially less value than non-bruised, relatively perfect fruit.

Vincent E. Bryan III, et al. U.S. patent application Ser. No. 12/371,446 entitled "Mobile System For Improving The Picking And Preliminary Processing Of Apples, Citrus, Stone Fruit And Like Objects," incorporated herein by reference, discloses a mobile system for assisting in the picking, culling and bin packing of apples and like fruit.

It is an object of this invention to provide a dry bin or downloader conveyor that will accept apples or other objects from a relatively elevated cross conveyor; that will then gently and quickly lower the accepted objects into a bin; and that will then place the objects in the bin in such a way as to minimize the likelihood that the objects will be bruised or otherwise damaged.

It is another object to provide a downloader conveyor that will handle a relatively high volume of apples or other objects at a relatively high speed, yet in a gentle manner.

It is yet another object of the invention to provide such a dry bin or downloader conveyor that is reliable and rugged in operation and yet relatively inexpensive to manufacture and maintain.

Other objects and advantages of the invention will become apparent upon reading the detailed description and upon reference to the drawings. Throughout the drawings, like reference numerals refer to like parts.

BRIEF DESCRIPTION OF THE DRAWINGS

FIG. 4 is a front elevational view of the dry bin or downloader conveyor shown in FIG. 2.

FIG. 5 is a side elevational view of the downloader conveyor shown in FIG. 3 and an associated dry bin.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications, and equivalents that may be included within the spirit and scope of the invention as defined by the appended claims.

Figure 1:
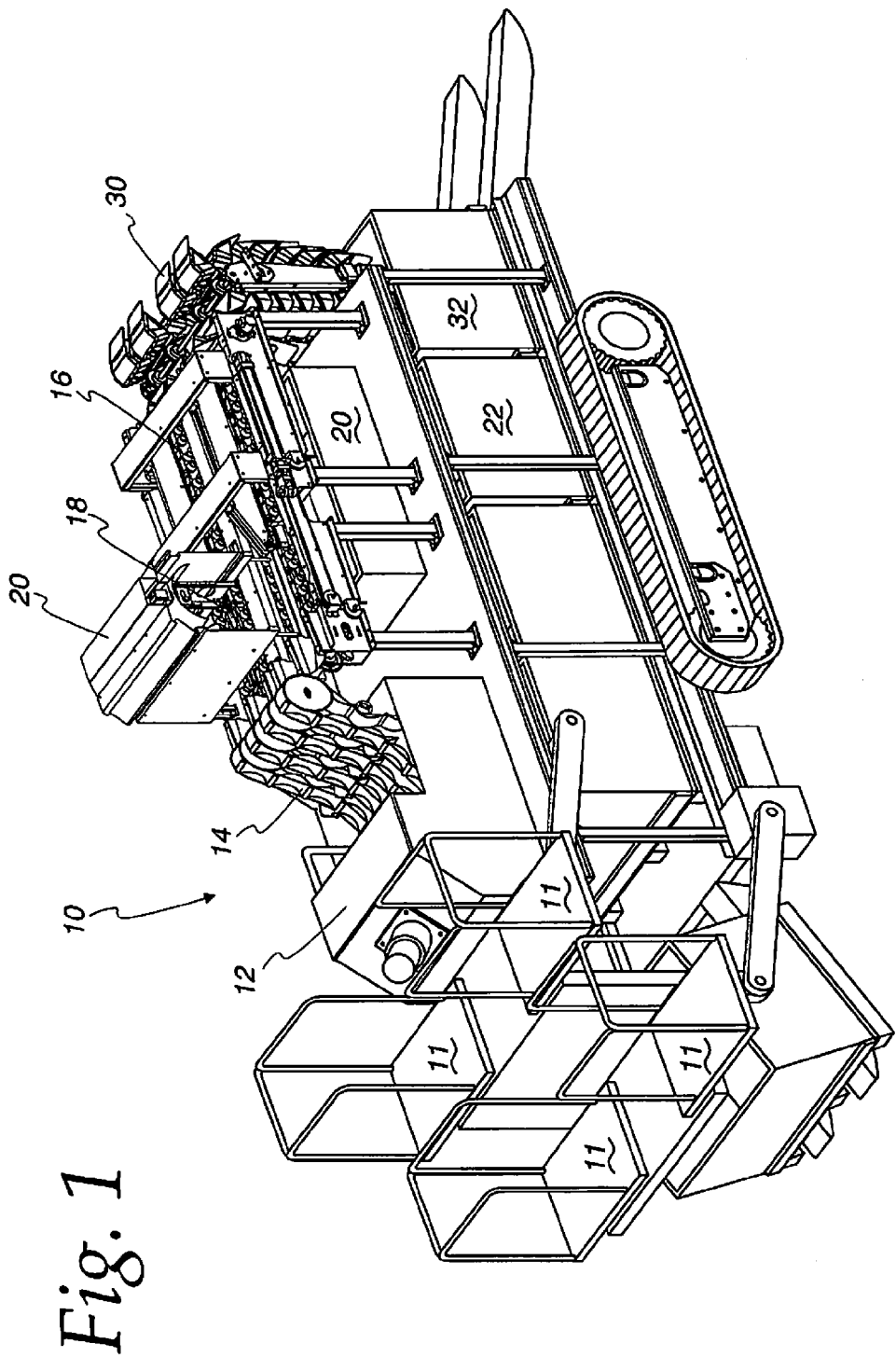
FIG. 1 is an isometric view of a vehicle adapted for improving the picking and preliminary processing of apples, citrus, stone fruit, sweet potatoes, fish and like objects, which includes a downloader conveyor embodying the present invention.
Figure 2:
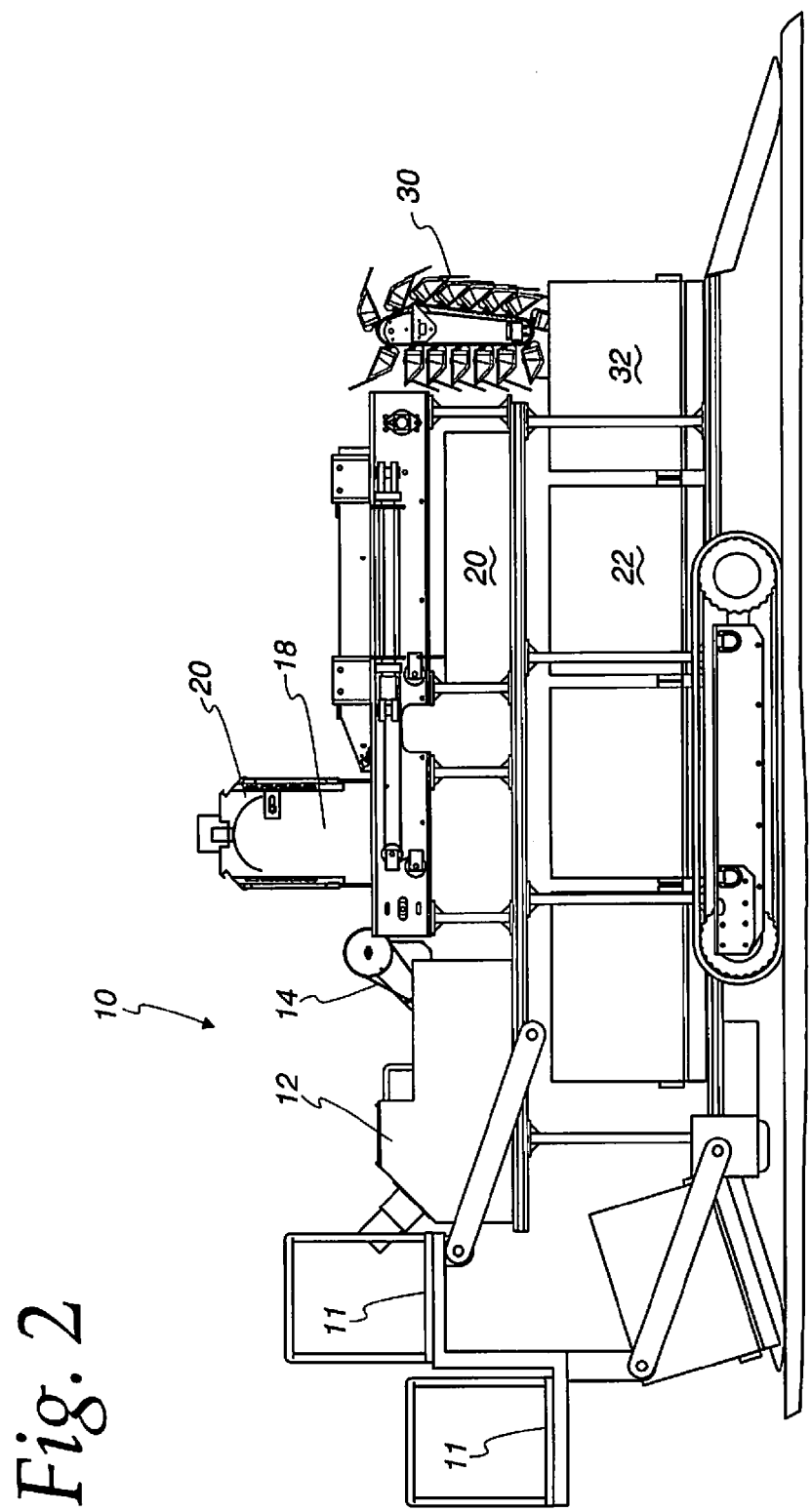
FIG. 2 is a side elevational view of the vehicle shown in FIG. 1.

Turning first to FIGS. 1 and 2, there is shown a mobile device 10 for assisting in the harvesting of apples or like objects. One embodiment of the mobile tracked device is illustrated and claimed in the co-pending patent application cited above. In general, this mobile device 10 is provided with one or more picking stations 11. Members of a picking crew (not shown) can stand upon these stations 11, or they can walk upon the orchard ground. Each crew member has access to the distal end of a pneumatic transport tube (not shown), as also indicated in the co-pending patent application cited above. That tube transport system is also described and claimed in Vincent E. Bryan, Jr., et al. co-pending U.S. patent application Ser. No. 12/055,209 filed Mar. 25, 2008 entitled "Transport System for Fruit and Like Objects" incorporated herein by reference.

As described in both of the above referenced applications, picked apples or objects travel rapidly down the transport tubes into a deceleration device 12. One such deceleration device can be provided for each tube. Once the objects are decelerated and are reintroduced to ambient air pressure, the apples or other objects are extracted from the deceleration devices by one or more extraction conveyors 14. A combination deceleration device and extraction conveyor is described and claimed in Vincent E. Bryan, Jr., et al. PCT international patent Application No. PCT/US10/21412 entitled "Decelerator Comprising Deceleration Tank And Extraction Conveyor" incorporated herein by reference. The extraction conveyors transport the apples or other objects to one or more horizontally disposed cross conveyors 16, which can be of known design. As the objects move along the cross conveyors 16, they can be manually examined, or they can be photographed or otherwise examined by cameras or other discriminator equipment 18 conveniently located in a housing 20. Objects identified as having imperfections can be diverted from the cross conveyors 16 to a cull-collecting hopper 20. When the cull collecting hopper 20 has been filled with objects, the hopper empties into a bin 22, and the culls are deposited there. Other arrangements for handling the culls could be used.

Unculled apples or other objects of acceptable quality continue their transport movement along the cross conveyors 16 to a series of novel downloader conveyors 30.

Figure 3:
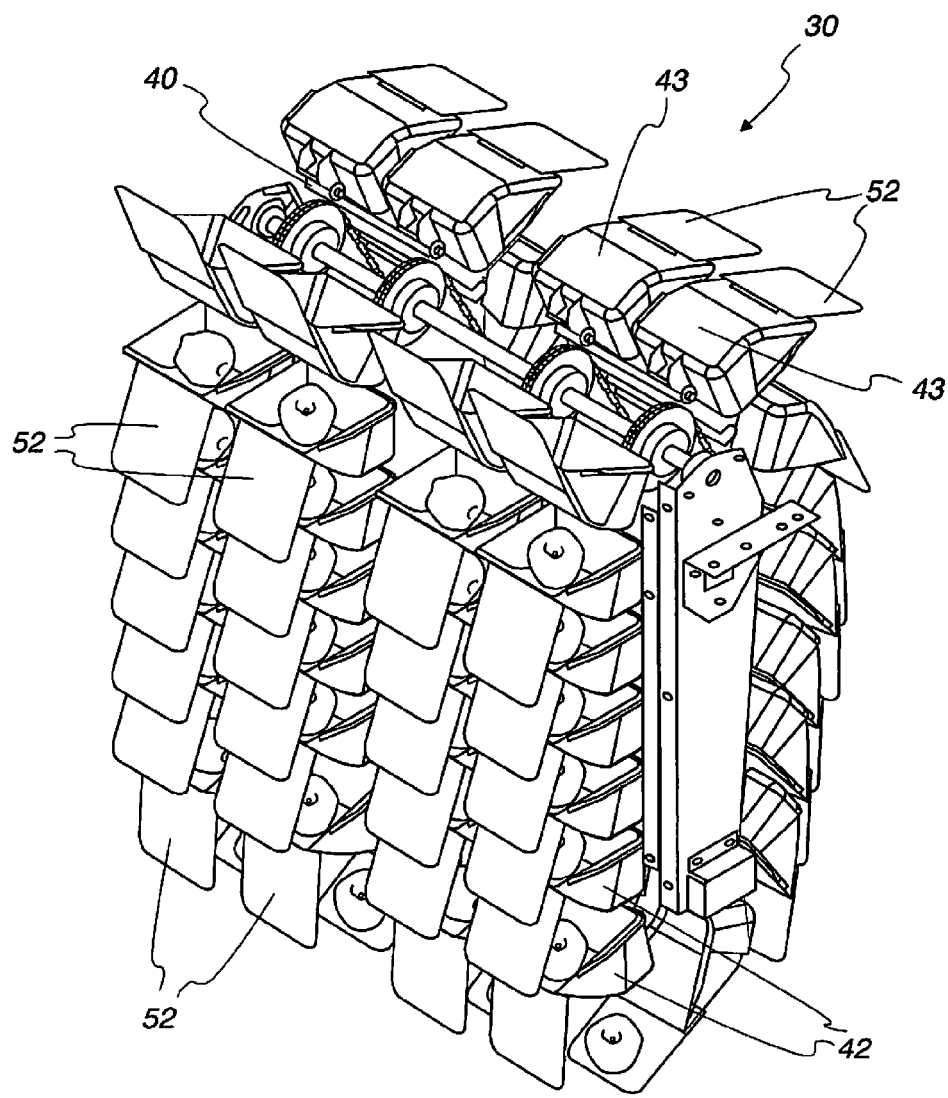
FIG. 3 is an isometric view of the downloader conveyor.

As shown in FIGS. 3, 4, and 5, a plurality of these downloader conveyors 30 can be located so that an individual downloader conveyor serves each corresponding cross conveyor. In accordance with the invention, the downloader conveyor 30 comprises at least one endless belt 40 which can be of the chain-link or other suitable variety. If desired, the action of the downloader chain drive can be directly mated to the cross conveyor. That motion can be provided by a hydraulic motor controlled by a computer and a rotary encoder on the linked shaft.

A plurality of cups 42 are attached to the belt 40. Each cup has a bottom 43 and a continuous sidewall 44 which includes an inclined ramp 45. In this embodiment of the invention, the cups 42 are sized and shaped to accept one or two apples or other objects which are to be downloaded into a receiving bin 32 as indicated in FIGS. 1, 2, and 5. The cups can be injection molded from a thermoplastic or formed from polyvinyl chloride or ABS material and lined with Poron PPT material or other dampening material.

It is a feature of the invention that the cups 42 are pivotally mounted to the drive chains 40 by any convenient mechanism 47 so that they can pivot as they reach the bottom of their path of travel, as suggested in FIG. 5. This pivoting or dumping action permits the contained objects to gently roll out of each cup as that cup rotates around the bottom of the conveyor drive. This action slows the motion of the apple or other object exiting from the cup, and this relatively slow motion inhibits bruising or damage to the objects. As the cups 42 travel around the lower sprocket wheel 70, they undergo centripetal acceleration due to the cup pivoting action relative to the sprocket mechanism 47.

As an object A falls or rolls from the cup 42, it is immediately engaged by a flexible skirt 52 which is pivotally attached to the ramp 45 at an intermediate point 53. This flexible skirt 52 further serves to break or obstruct and slow the falling motion of the object A. The skirts 52 can be made of neoprene or other soft, flexible but durable material, and they can be faced, if desired, with Poron PPT material.

The skirt 52 has a distal end 54 which is positioned and located so as to scrape across the bottom of the bin 32 or across the tops of the apples or other objects that have already been placed in the bin 32. In this way, the apples or other objects being delivered from the downloader 30 do not fall freely through any appreciable distance during their travel down into the bin 32 and into positions atop the bin floor or atop apples or other objects already placed in the bin.

As shown in FIG. 5, the flexible skirt 52, can be long enough and can be positioned so that it overlies and engages the outer lip 71 of the preceding cup ramp 45. This arrangement helps contain the apples or other objects until they reach the bottom of the conveyor for discharge. Therefore, the overhanging flexible skirt 52 attached to the upper cup engages and then slows the exiting or roll-out movement of the object A from its cup as the cup pivots and moves around the bottom of its conveyor travel.

If desired, the bin 32 underlying the downloader conveyor 30 can be horizontally traversed by any convenient bin transport mechanism to encourage the creation of a uniform layer of deposited apples or objects in the bin 32.

After a first layer of apples A or other objects has been laid down in the bin 32, the downloader conveyor 30 can be raised by a suitable known hydraulic, mechanical, or other vertical traversing mechanism here provided inside side rails 60, 61 so that later-delivered apples or objects will be gently deposited upon the top layers of apples already in place in the bin 32. Alternatively, the conveyor 30 can be pivoted upwardly by any known and convenient mechanism so as to locate the skirt distal ends 54 just above the already-deposited apples and so as to deposit arriving apples upon the already-received apples without damaging either. In accordance with this aspect of the invention, bruising or other damage to the apples or other objects is greatly ameliorated or eliminated.

The following is claimed as invention:

1. A conveyor, comprising, in combination, at least one endless belt, a plurality of cups, pivotal attachment mechanisms for pivotally attaching the cups to the endless belt so as to permit the cups to undergo centripetal deceleration as the objects in the cups exit from the cups, the cups being adapted to receive objects, each cup having a rigid cup bottom and at least a rigid back, rigid sides, and a rigid ramp disposed at an obtuse angle to the cup bottom; a skirt being attached to at least one of the cups; and
   the skirt being adapted to engage and break the fall of objects emanating from the cup.

2. A conveyor according to claim 1 wherein said cup is lined with flexible material.

3. A conveyor according to claim 1 wherein said skirt is pivotally attached to the cup ramp.

* * * * *